US 6,555,646 B2

(12) United States Patent
Volkers et al.

(10) Patent No.: US 6,555,646 B2
(45) Date of Patent: *Apr. 29, 2003

(54) PROCESS FOR PREPARING POLYCARBONATE

(75) Inventors: Andre Volkers, Wouw (NL); Marcel Puyn, Swolgen (NL); Ralph Stevens, Wageningen (NL)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/682,413

(22) Filed: Aug. 30, 2001

(65) Prior Publication Data

US 2003/0055202 A1 Mar. 20, 2003

(51) Int. Cl.$^7$ .............................................. C08G 64/00
(52) U.S. Cl. ........................................ 528/196; 528/198
(58) Field of Search ................................ 528/196, 198; 526/62

(56) References Cited

U.S. PATENT DOCUMENTS

| 4,217,438 A | 8/1980 | Brunelle et al. ............. 528/202 |
| 4,401,804 A | 8/1983 | Wooten et al. ............... 528/272 |
| 4,532,290 A | 7/1985 | Jaquiss et al. ............... 524/417 |
| 5,210,268 A | 5/1993 | Fukuoka et al. ............. 558/270 |
| 5,306,801 A | 4/1994 | Sakashita et al. ........... 528/198 |
| 5,319,066 A | 6/1994 | King, Jr. ....................... 528/199 |
| 5,354,791 A | 10/1994 | Gallucci ....................... 523/466 |
| 5,371,170 A | 12/1994 | Sakashita et al. ........... 528/198 |
| 5,496,921 A | 3/1996 | Sakashita et al. ........... 528/487 |
| 5,606,007 A | 2/1997 | Sakashita et al. ........... 528/176 |
| 5,608,027 A | 3/1997 | Crosby et al. ................ 528/51 |
| 5,717,057 A | 2/1998 | Sakashita et al. ........... 528/198 |
| 5,834,615 A | 11/1998 | Nishihira et al. ........... 558/274 |
| 5,922,816 A | 7/1999 | Hamilton ..................... 525/446 |
| 5,942,594 A | 8/1999 | Nakae et al. ................. 528/196 |
| 6,177,536 B1 | 1/2001 | Anamizu et al. ............ 528/196 |
| 6,252,035 B1 | 6/2001 | McCloskey et al. ........ 528/196 |

FOREIGN PATENT DOCUMENTS

| JP | 9059371 | 3/1997 |
| JP | 2001-31754 | 6/2001 |

OTHER PUBLICATIONS

English Abstract for Japanese Patent No. JP200131754; Publication Date Jun. 6, 2001: MANUFACTURE OF POLC ARBONATE RESIN; 1 page.

International Search Report; International Application No. PCT/US 02/25370; International Publication Date: Aug. 8, 2002; 7 pages.

*Primary Examiner*—Terressa M. Boykin

(57) ABSTRACT

A process for quenching a catalyst used in the manufacture of polycarbonate by melt polycondensation of a dihydroxy compound and a diester. The process includes adding a quencher composition to an intermediate polycarbonate to deactivate residual catalyst. The quencher composition includes a compound having at least one sulfonic acid group and at least one amino group.

14 Claims, 2 Drawing Sheets

CONVENTIONAL INTERFACIAL

MELT

PROCESS FOR PREPARING POLYCARBONATE

BACKGROUND OF INVENTION

This disclosure relates to a manufacturing method for preparing polycarbonates, and more particularly, to a method for quenching the activity of residual catalyst employed in the manufacture of the polycarbonates.

Aromatic polycarbonates are used in a variety of applications due to their excellent mechanical and physical properties including, among others, impact and heat resistance, strength and transparency. There are three general processes known for the commercial manufacture of aromatic polycarbonates, which are illustrated in FIG. 1. The conventional interfacial process, as shown in FIG. 1A, and the phosgene-based melt process, as shown in FIG. 1B, start with the reaction of phosgene with carbon monoxide. The third general process, a "no phosgene" melt process as shown in FIG. 1C, was developed to eliminate the use of highly toxic phosgene in the process flow. Of these general methods, the "no phosgene" melt process shown is preferred since it prepares polycarbonates less expensively than the interfacial process and avoids the use of highly toxic phosgene.

Both types of melt processes (FIGS. 1B, and 1C) make use of a diarylcarbonate, such as diphenylcarbonate (DPC) as an intermediate, which is polymerized with a dihydric phenol such as bisphenol A (BPA) in the presence of an alkaline catalyst to form a polycarbonate in accordance with the general reaction scheme shown in FIG. 2. This polycarbonate may be extruded or otherwise processed, and may be combined with additives such as dyes and UV stabilizers. In many cases, however, the presence of residual catalyst in the finished polycarbonate has a detrimental affect on the quality of the product, leading to poor color, a decrease in molecular weight, a decrease in transparency, or undesirable rheological properties. Residual catalyst may also interact with additives, detracting from their efficacy and rendering the polycarbonate prone to thermal decomposition. Thus, it is desirable to reduce the levels of residual catalyst in the finished polycarbonate to minimize these interactions. Such reduction is referred to as "quenching."

In the production of optical quality polycarbonates, several reactors are used in sequence to prepare the final product. The final reactors in this sequence subject the reaction mixture to both high temperature and high vacuum. This treatment assists in the removal of byproduct phenol, unreacted monomer and short oligomers, improving the overall quality of the final product. For optical quality products, this is also the phase of the reaction at which quencher is added. Because a very small amount of actual quencher is required, the quencher is usually added in a solvent.

A slight excess of the quencher is typically added directly to the polycarbonate. The quencher compound generally comprises an acid ester or an acid compound that is effective for deactivating or neutralizing the alkaline catalyst. However, it has been found that the acidic functionality of the quencher in the extruded or otherwise processed finished polycarbonate deleteriously affects hydrolytic stability. Discoloration and deterioration of other properties has been observed.

SUMMARY OF INVENTION

A process for quenching an alkaline catalyst used in a melt polycondensation reaction for the production of polycarbonate is described. The process includes combining an intermediate polycarbonate composition with a quenching composition in a reactor, wherein the quenching composition includes a compound having at least one acid or acid ester moiety and at least one amine moiety. The intermediate polycarbonate is heated and the pressure is reduced in the reactor to produce a finished polycarbonate. Advantageously, the use of an excess amount of the quencher compound to neutralize the alkaline catalyst does not deleteriously affect the properties of the finished polycarbonate.

These and other features will become better understood from the detailed description that is described in conjunction with the accompanying drawings.

BRIEF DESCRIPTION OF DRAWINGS

Referring now to the figures, which are meant to be illustrative, not limiting.

DETAILED DESCRIPTION

Figure 1A:
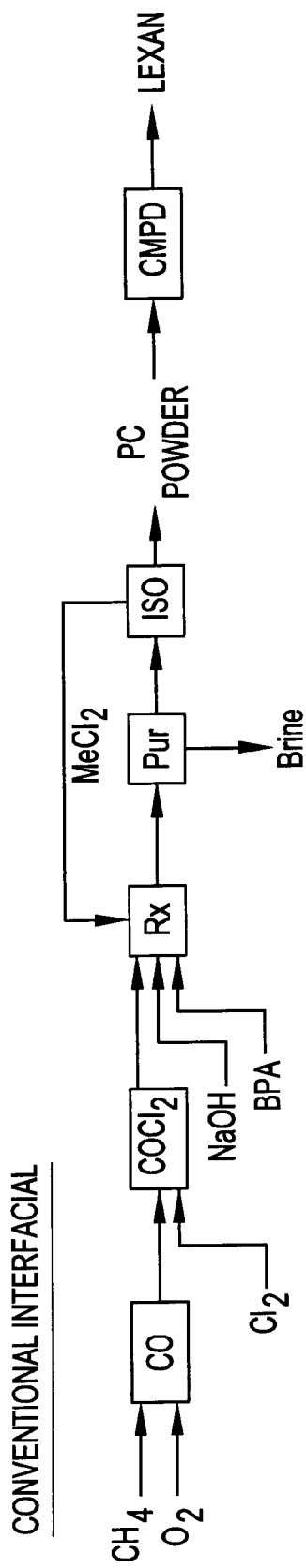
FIG. 1 illustrates three prior art processes for the production of polycarbonate.
Figure 1B:
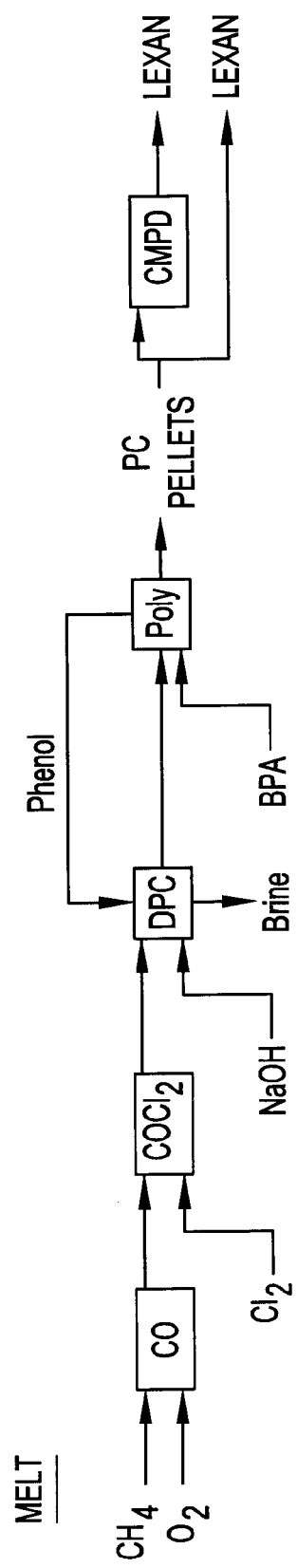
Figure 1C:
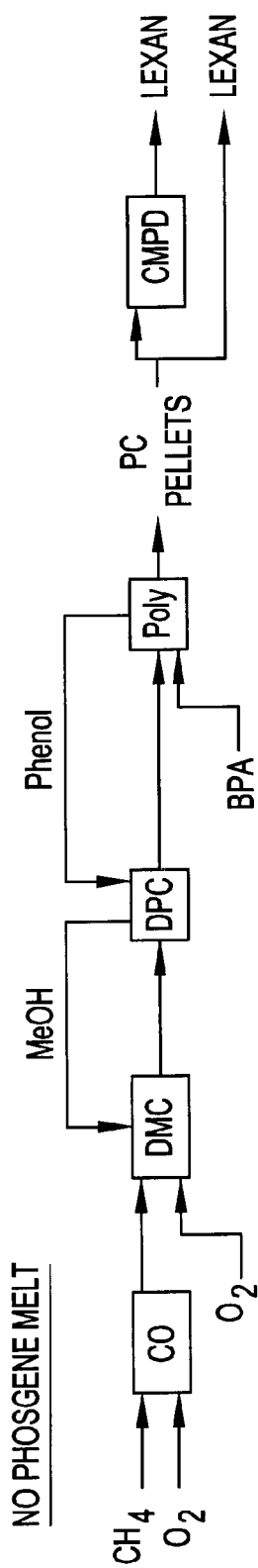
Figure 2:
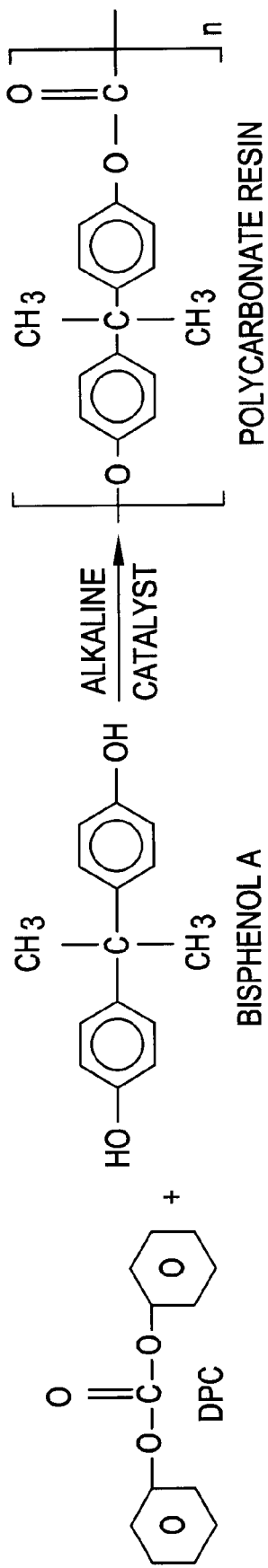
FIG. 2 illustrates a prior art process carried out in a base-catalyzed melt polycondensation reaction.

A method for neutralizing or deactivating residual catalyst present from the melt reaction of a diaryl carbonate and a dihydric phenol includes adding a novel quencher compound to an intermediate polycarbonate prior to subjecting the reaction mixture to high temperature and vacuum for removal of byproduct phenol, unreacted monomer and short oligomers. In a preferred embodiment, the quencher compound comprises a molecule having both at least one amino group and at least one acid group or acid ester group. In another embodiment, the quencher is a zwitterionic compound. The quencher compound is added in an amount effective to prevent changes during the finishing of the polycarbonate, e.g., no branching, no molecular weight change, etc. Advantageously, it has been found that using quencher compositions having an amino group and an acid group in the same molecule unexpectedly results in improved polycarbonate stability such as hydrolytic stability.

Preparation of polycarbonate compositions by melt polycondensation reaction is known in the art, for example from U.S Pat. Nos. 5,717,057, 5,606,007 and 5,319,066, which are incorporated herein by reference.

As used herein, the terms "polycarbonate", "polycarbonate composition", and "composition comprising aromatic carbonate chain units" includes compositions having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

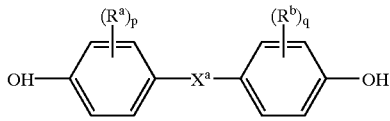

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

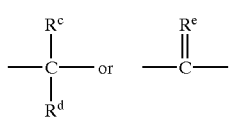

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl)methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl)octane; 1,1-bis(4-hydroxyphenyl) propane; 1,1-bis(4-hydroxyphenyl)n-butane; bis(4-hydroxyphenyl) phenylmethane; 2,2-bis(4-hydroxy-1-methylphenyl)propane; 1,1-bis(4-hydroxy-t-butylphenyl) propane; bis(hydroxyaryl)alkanes such as 2,2-bis(4-hydroxy-3-bromophenyl) propane; 1,1-bis(4-hydroxyphenyl)cyclopentane; 4,4'-biphenol; and bis (hydroxyaryl)cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid. Polyarylates and polyester-carbonate resins or their blends can also be employed.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units.

While a preferred diaryl carbonate for use in the method is diphenylcarbonate, other diaryl carbonates may be used to make speacialty polycarbonates. Various methods for synthesis of diaryl carbonates are known, for example from U.S. Pat. Nos. 5,210,268, and 5,834,615, all of which are incorporated herein by reference.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

The melt polycondensation reaction generally takes place in a series of reactors. The diarylcarbonate and dihydric alcohol are first mixed in a reactor vessel. To this reactor vessel, a catalyst is added to form an intermediate polycarbonate. Catalysts used in the method of the present invention to form the intermediate composition are basic catalysts, such as alkali metal or alkaline earth metal compounds or nitrogen-containing basic compounds, which are effective to catalyze the production of polycarbonates by melt condensation of the diarylcarbonate and the dihydric phenol. Any of the known alkaline catalysts useful for this purpose may be employed.

After the intermediate polycarbonate is formed, byproduct phenol is continuously removed from the reactors to ensure the desired or targeted molecular weight for the finished polycarbonate. In order to effectively remove byproduct phenol from the vessel, the finishing reaction preferably occurs at elevated temperatures and reduced pressures. Preferably, the temperature is greater than about 260° C. More preferably, the temperature is in a range from about 270° C. to about 310° C. The pressure of the reaction is preferably reduced to a pressure less than about 0.8 torr. More preferably, the reactor is pressurized to a pressure within a range from about 0.2 to about 0.6 torr. Once the final polycarbonate target specifications have been reached, a slight excess of the quencher compound is added to completely neutralize or deactivate the alkaline catalyst and the mixture is then passed through an extruder or otherwise processed.

The quencher compositions include a compound having at least one acid or acid ester moiety and at least one amine moiety. The acid or acid ester moiety used may be a Lewis acid, a Bronsted acid or an ester of a strong acid so long as it is capable of neutralizing the alkaline catalyst compounds used in the melt polycondensation reaction. Moreover, in the case where $R_a$, $R_b$ or $R_c$ is a hydrogen, the use of its corresponding isotope, such as tritium and deuterium, are contemplated as well. The amino functionality may be a primary, secondary or tertiary amine, quaternary ammonium or the like. Preferred compounds have the general formula (V):

$$R_aR_bN\text{—}A\text{—}SO_3R_c \qquad (V)$$

wherein $R_a$ and $R_b$ are each independently hydrogen, $C_1$–$C_{12}$ alkyl, $C_1$–$C_{12}$ aryl, or $C_1$–$C_{18}$ alkylaryl; $R_c$ is hydrogen, deuterium, or tritium and A is $C_1$–$C_{12}$ alkyl, $C_1$–$C_{12}$ aryl, or $C_1$–$C_{18}$ alkylaryl. Alternatively, $R_a$ and $R_b$, either singly or in combination, may form an aromatic or non-aromatic heterocyclic compound with N. Examples of suitable heterocyclic structures include pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl or the like. Other heterocyclic structures will be apparent to those skilled in the art in view of this disclosure.

In another embodiment, the quencher compositions include a compound having the general formula (VI) as follows:

$$R_aR_bR_cN^+\text{—}A\text{—}SO_3 \qquad (VI)$$

wherein $R_a$, $R_b$, are each independently hydrogen, $C_1$–$C_{12}$ alkyl, $C_1$–$C_{12}$ aryl, or $C_1$–$C_{18}$ alkylaryl; $R_c$ is a hydrogen, deuterium, or tritium and A is $C_1$–$C_{12}$ alkyl, $C_1$–$C_{12}$ aryl, or $C_1$–$C_{18}$ alkylaryl. Alternatively, $R_a$ and $R_b$, either singly or in combination, forms an aromatic or non-aromatic heterocyclic compound with N. Examples of suitable heterocyclic structures include pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl or the like. The compounds of formula (II) are commonly referred to as zwitterionic or dipolar ions provided the amine moiety is more basic than the anion of the acid moiety.

The quencher compositions are formulated in a suitable carrier. The amount of quencher in the quencher composition can be varied over a substantial range, since the carrier acts primarily as a diluent to facilitate uniform addition of small amounts of quencher to the product of the melt polycondensation reaction. Quencher compositions with higher concentrations of quencher compound can be used in smaller amounts, while quencher compositions with lower quencher compound concentrations are used in larger amounts to arrive at the same final levels of quencher. In general, the level of quencher compound in the quencher composition will be from about 0.1 to 10% by volume, preferably around 1%.

The finished polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

This invention provides a method of efficiently manufacturing polycarbonates with improved color, yet at the same time inhibits side reactions, minimizes branching, reduces changes in molecular weight and results in improved hydrolytic stability. The polycarbonates produced can be pelletized, and are ideal for a number of applications, including use as general molding materials, as sheets and other construction materials, as headlight lenses for automobiles, as eyeglasses, optical lenses, optical recording materials, and other optical materials, as well as other applications. These polycarbonates are especially ideal for use as an optical molding material.

The following examples are presented for illustrative purposes only, and are not intended to limit the scope and breadth of the disclosure.

EXAMPLE

In this example, a liquid solution at room temperature containing a quencher compound was injected into a mini-reactor to an intermediate polycarbonate composition having a molecular weight of about 5,000 to about 8,000 grams/mole. The intermediate polycarbonate composition was produced by melt polycondensation reaction of diphenylcarbonate and bisphenol A in the presence of an alkaline catalyst. The amount of catalyst was $1\times10^6$ mole catalyst per mole of bisphenol A. A quencher compound was added to the intermediate polycarbonate. The mixture was then heated to 300° C. and the pressure was stepwise decreased to 1 millibar. The product was isolated after 30 minutes.

The total amounts of quencher varied from 0 equivalents to 20 equivalents based on the amount of alkaline catalyst. The quenching efficiency was measured in terms of changes in molecular weight and branching species before and after exposure to heating and pressure reduction. A comparison of samples A and J illustrates the relative effect residual catalyst has during the subsequent temperature and vacuum processing. Sample A contained no quencher and generated the greatest amount of branching species as well as the greatest change in molecular weight during the heating and pressure reduction processing. Sample A was used to set the baseline or 0% quenching efficiency. Sample J is the intermediate polycarbonate prior to further processing, e.g., heat and pressure reduction. The intermediate polycarbonate of Sample J is at the targeted molecular weight and does not contain detectable levels of undesirable branching species. Sample J was used to set the maximum or 100% quenching efficiency. The quenching efficiency results for various quenchers are shown in Table I.

TABLE I

| Quencher | | Equivalents of quencher per alkaline catalyst | % Quenching Molecular Weight | Efficiency Branching Species |
|---|---|---|---|---|
| A* | — | — | 0 | 0 |
| B | EPPS | 3 | 14 | 76 |
| C | EPPS | 10 | 73 | 100 |
| D | EPPS | 15 | 99 | 100 |
| E | EPPS | 20 | 98 | 100 |
| F | PIPES | 2 | 100 | 100 |
| G | PIPES | 10 | 100 | 100 |
| H | DMANSA | 2 | 100 | 100 |
| I | DMANSA | 10 | 100 | 100 |
| J | Intermediate Polycarbonate | — | 100 | 100 |

*Control

Samples B–E are directed to adding N-(2-hydroxyethyl)piperazine-N'-3-propanesulfonic acid (EPPS) at various equivalent amounts based on the residual catalyst present in the intermediate polycarbonate. It has been determined that the addition of 15 equivalents to the intermediate polycarbonate is effective for preventing an increase in branching species and molecular weight changes during the subsequent heating and pressure reduction process.

Samples F–G are directed to adding 1,4-piperazine bis (ethanesulfonic acid) (PIPES) at various equivalent amounts based on residual catalyst. It has been determined that the addition of 2 equivalents to the intermediate polycarbonate is effective for preventing an increase in branching species and molecular weight changes during the subsequent heating and pressure reduction process.

Samples H–I are directed to adding 5-dimethylamino-1-napthalenesulfonic acid (DMANSA) at various equivalent amounts. It has been determined that the addition of 2 equivalents based on residual catalyst to the intermediate polycarbonate is effective for preventing an increase in branching species and molecular weight changes during the subsequent heating and pressure reduction process.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A process for quenching an alkaline catalyst used in a melt polycondensation reaction for the production of polycarbonate, the process comprising:

combining an intermediate polycarbonate composition with a quenching composition in a reactor, wherein the quenching composition comprises a difunctional compound having at least one acid or acid ester moiety and at least one amine moiety, heating the intermediate polycarbonate; and reducing the pressure in the reactor to produce a finished polycarbonate.

2. The process according to claim 1, wherein the quenching composition comprises a compound of formula:

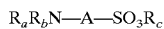

wherein $R_a$, and $R_b$ are each independently hydrogen, $C_1$–$C_{12}$ alkyl, $C_1$–$C_{12}$ aryl, or $C_1$–$C_{18}$ alkylaryl; $R_a$, $R_b$, singly or in combination form a heterocyclic ring structure with N; $R_c$ is a hydrogen; and A is $C_1$–$C_{12}$ alkyl, $C_1$–$C_{12}$ aryl, or $C_1$–$C_{18}$ alkylaryl.

3. The process according to claim 1, wherein the quenching composition comprises a compound of formula:

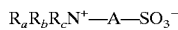

wherein $R_a$ and $R_b$ are each independently hydrogen, $C_1$–$C_{12}$ alkyl, $C_1$–$C_{12}$ aryl, or $C_1$–$C_{18}$ alkylaryl; $R_c$ is a hydrogen; $R_a$, $R_b$, singly or in combination form a heterocyclic ring structure with N; and A is $C_1$–$C_{12}$ alkyl, $C_1$–$C_{12}$ aryl, or $C_1$–$C_{18}$ alkylaryl.

4. The process according to claim 1, wherein the quenching composition comprises N-(2-hydroxyethyl)piperazine-N'-3-propanesulfonic acid compound.

5. The process according to claim 1, wherein the quenching composition comprises 1,4,-piperazinebis (ethanesulfonic acid).

6. The process according to claim 1, wherein the quenching composition comprises 5-dimethylamino-1-napthalenesulfonic acid.

7. The process according to claim 4, wherein about 15 equivalents of the quencher compound per alkaline catalyst is added to quench the residual catalyst.

8. The process according to claim 5, wherein about two equivalents of the quencher compound per alkaline catalyst is added to quench the residual catalyst.

9. The process according to claim 6, wherein about two equivalents of the quencher compound per alkaline catalyst is added to quench the residual catalyst.

10. The process according to claim 1, wherein heating and reducing the pressure in the reactor are at a temperature and a pressure effective for removing low molecular weight oligomers, byproduct phenol and unreacted monomers from the intermediate polycarbonate.

11. The process according to claim 1, wherein heating the intermediate polycarbonate comprises increasing the temperature to an amount greater than 260° C.

12. The process according to claim 1, wherein heating the intermediate polycarbonate comprises increasing a temperature to greater than 260° C.

13. The process according to claim 1, wherein reducing the pressure comprises stepwise reducing the pressure to less than about 0.8 torr.

14. A polycarbonate article manufactured in accordance with the process of claim 1, wherein the polycarbonate is substantially a linear polycarbonate comprising less than 1500 ppm of a branched polycarbonate structure.

* * * * *